United States Patent [19]

Jones et al.

[11] 4,420,520

[45] Dec. 13, 1983

[54] AREA COATED PAINT MASK AND METHOD

[75] Inventors: Wallace R. Jones, Waite Hill Village; Paul A. Krieger, Bay Village; John F. Haas, Chagrin Falls, all of Ohio

[73] Assignee: The Excello Specialty Company, Cleveland, Ohio

[21] Appl. No.: 365,481

[22] Filed: Apr. 5, 1982

Related U.S. Application Data

[63] Continuation of Ser. No. 165,721, Jul. 3, 1980, abandoned.

[51] Int. Cl.[3] .............................................. B32B 7/10

[52] U.S. Cl. ...................................... 428/42; 427/282; 427/421; 428/40; 428/194; 428/195; 428/352

[58] Field of Search .................. 427/282, 421; 428/40, 428/42, 194, 195, 352

[56] References Cited

U.S. PATENT DOCUMENTS

| | | | |
|---|---|---|---|
| 2,210,233 | 8/1940 | De Lillo | 91/65 |
| 2,271,888 | 2/1942 | Manley | 41/29 |
| 2,996,041 | 8/1961 | Carpenter et al. | 118/505 |
| 3,752,304 | 8/1973 | Alef | 206/58 |
| 4,024,837 | 5/1977 | Snyder | 118/505 |
| 4,033,803 | 7/1977 | Coder | 156/71 |
| 4,082,875 | 4/1978 | Citron | 428/134 |

FOREIGN PATENT DOCUMENTS

| | | | |
|---|---|---|---|
| 1042283 | 11/1978 | Canada | 427/282 |
| 2449033 | 10/1974 | Fed. Rep. of Germany | 427/282 |
| 10907 | 4/1979 | Netherlands | 427/282 |
| 1176931 | 1/1970 | United Kingdom | 427/282 |

*Primary Examiner*—Norman Morgenstern
*Assistant Examiner*—Janyce A. Bell
*Attorney, Agent, or Firm*—Fay & Sharpe

[57] ABSTRACT

A mask for and method of masking a workpiece which has some predetermined continuous demarcation zone whereby precise painting of a first area disposed on one side of the zone is accommodated. The mask includes opposed faces and a peripheral edge or contour having substantially the same conformation as the demarcation zone. One face includes a narrow band of adhesive extending therearound adjacent the peripheral edge. The mask is accurately positioned on the workpiece to precisely mask a second area thereof along and on the other side of the demarcation zone from the workpiece first area. The first area may then be painted and the mask thereafter removed. To accommodate application in production environments, the other or outer face of the mask may be release coated so that a stack or pad comprised of a plurality of identical masks may be provided at a workstation for individual application to consecutive workpieces. When such a pad is generated, a plurality of mask layers are first prepared so as to have an adhesive band of the desired conformation on the one face thereof. Thereafter, the plurality of layers are placed in a stacked relationship to each other and then die cut to have a predetermined peripheral edge or contour. The subject mask and method are advantageously useable with any number of painting applications having regular and/or irregular demarcation zone conformations.

8 Claims, 7 Drawing Figures

AREA COATED PAINT MASK AND METHOD

This application is a continuation, of application Ser. No. 165,721, filed July 3, 1980 now abandoned.

BACKGROUND OF THE INVENTION

This invention pertains to the art of painting and more particularly, to spray painting a predetermined area of a workpiece.

The invention is particularly applicable to a so-called area coated paint mask for and method of masking a workpiece along a predetermined continuous demarcation zone and will be described with particular reference thereto. However, it will be appreciated by those skilled in the art that the invention has broader applications and may be advantageously adapted to use in other painting environments.

In many industries, it is desired to spray paint finished products or the like so that they will be in one color or tone on one side of some predetermined demarcation zone and of another color or tone on the other side of the demarcation zone. This type of finish painting is often associated with the automobile and appliance industries, although it is utilized elsewhere for other products and product lines. In addition, demarcation zones are present in so-called refinish painting work and in painting work performed subsequent to some product or workpiece surface repair. In order to obtain satisfactory or aesthetically pleasing results, it is necessary to maks the product at least along the demarcation zone to prevent paint overspray onto adjacent areas of the product which are not to be painted. Also, such masking must be substantially precise along the demarcation zone so as to maintain consistency of finish and/or appearance between workpieces of the same type and style.

Paint masking systems of many types and styles have been known and used in the art for many years. Among these are, for example, use of conventional masking tape and the like. In the most basic of these prior systems, the masking tape is affixed to the workpiece with one tape side edge disposed coextensive with the demarcation zone. This then separates that portion of the workpiece surface which is to be painted from that portion which is not to be painted. Moreover, the tape is also typically used to retain paint drapes of paper, cloth or the like in a covering relationship at least adjacent the demarcation zone with that section of a workpiece which is to be protected during a painting process.

One particular drawback to this type of general masking system resides in the extremely cumbersome installation procedures required and the close correlation between the overall success of the mask and the ability and/or experience of the mask installer. Another difficulty encountered has been that prior masking systems are only reliably or viably useful for demarcation zones or break line areas which have generally straight line configurations. Demarcation zones or break line areas which are curvilinear, closed or continuous or are otherwise unusually configured are very difficult to mask using such systems. Indeed, in such situations, the ability and experience of the person applying the mask again plays a very significant role in determining the overall aesthetic success of the final paint finish obtained.

Over the years, consumer tastes and product designs have changed and/or been modified so that paint finishes on various products, including automobiles and the like, necessitate the provision of masks and masking method which will accommodate precise masking of small or irregular areas to accommodate the desired final paint finish. Such a masking arrangement is referred to as an area coated paint mask since it typically covers the entirety of a predetermined workpiece area. Heretofore, however, entirely satisfactory results have not been obtainable in systems of this general type due to manufacturing and/or installation difficulties. Thus, generally unacceptable and inconsistent painting results have been a problem in this type of painting environment.

It has, therefore, been considered desirable to develop and provide a new and improved area coated paint mask and method which would overcome the foregoing practical problems encountered in using previously known masking methods and techniques. The subject invention is deemed to meet these needs as well as others. The invention provides a new and improved area paint mask and method which are simple, effective, accommodate masking alone demarcation zones which have many different configurations and readily adapted to use in a wide variety of applications.

BRIEF DESCRIPTION OF THE INVENTION

The subject invention focuses on a new area coated paint mask and method to facilitate spray painting of a workpiece first area bounded or defined by a predetermined continuous demarcation zone and which demarcation zone separates the workpiece first area from a workpiece second area. In practicing the invention, a particular mask construction having a predetermined adhesive band disposed on a portion of one face thereof and a predetermined peripheral edge configuration is advantageously employed. The mask is adapted to be adhesively secured to a workpiece second area in a precise manner to facilitate a desired painting result.

More particularly, the method includes providing a mask layer comprises of a thin, flexible material having opposed faces and applying adhesive to one face of the layer to form a band-like adhesive area at least generally conforming to the outline of some predetermined demarcation zone. Thereafter, the method contemplates cutting the mask layer to from a mask having a peripheral edge or contour of at least the same general conformation as the demarcation zone with the adhesive band-like area disposed at least adjacent the mask peripheral edge.

In accordance with another aspect of the method, the step of locating a release coating on the face of the mask layer opposite to the one face is also included. Such coating is selected to be of a type which is releasably compatible with the adhesive material. Preferably, the release coating is provided or integral with the opposite face of the mask layer itself.

In accordance with another aspect of the method, the steps of providing, applying, and locating are identically repeated on a plurality of mask layers. Thereafter, a step of producing a pad of identical masks is performed by stacking the pluality of mask layers relative to each other so that the adhesive band-like area of each is in direct engagement with the release coating on the opposite face of the next adjacent mask layer with the adhesive areas of all the layers being aligned. The step of cutting is next performed to simultaneously cut the stacked mask layers into masks.

According to yet another aspect of the invention, an area coated paint mask construction is provided. The mask is comprised of a thin, flexible paint mask layer having opposed faces and a peripheral edge or contour which is configured to have the same general conformation as a continuous demarcation zone on a workpiece with which the mask is to be associated. The adhesive is disposed on one face of the mask layer to form a narrow band-like adhesive zone at least adjacent the mask peripheral edge and is adapted to adhesively engage an associated workpiece at least adjacent the demarcation zone thereof. In the preferred construction, each mask layer includes a release coating on the face opposite the adhesive to accommodate the provision of a pad of identical masks. In each a pad, the one face of each mask is disposed in direct engagement with the release coating of the next adjacent mask whereby individual ones of the masks may be removed from the pad as required for use.

Also provided in accordance with the present invention is an overall method for painting a workpiece to facilitate spray painting of a workpiece first area which is bounded by some desired and predetermined demarcation zone. The method allows precise painting of the first area along the demarcation zone while protecting a workpiece second area.

The principle object of the present invention is the provision of a new area coated paint mask and method.

Another object of the invention is the provision of such a mask and method which are simple and easy for use for obtaining reliable painting results along predetermined regular and/or irregular demarcation zones.

Still another object is the provision of an area coated paint mask and method which may be readily adapted to use with any number of varied demarcation zone configurations.

A further object of the invention resides in an area coated paint mask and method which may be readily and advantageously employed in production line type environments.

Still other objects and advantages for the invention will become readily apparent to those skilled in the art upon a reading and understanding of the following specification.

BRIEF DESCRIPTION OF THE DRAWINGS

The invention may take physical form in certain parts and arrangements of parts, preferred and alternative embodiments of which will be described in detail in the specification and illustrated in the accompanying drawings which form a part hereof and wherein.

DETAILED DESCRIPTION OF THE PREFERRED AND ALTERNATIVE EMBODIMENTS

Figure 1:
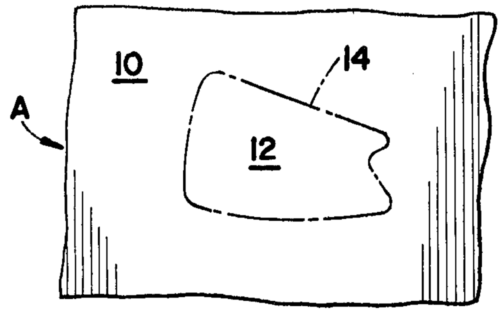
FIG. 1 is a side elevational view of a workpiece having two workpiece areas separated by an irregular demarcation zone and which workpiece is particularly suited for masking by means of the subject mask and method.
Figure 3:
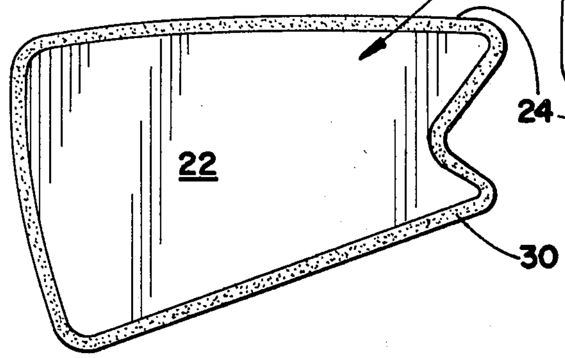
FIG. 3 is a bottom plan view of the mask of FIG. 2.
Figure 2:
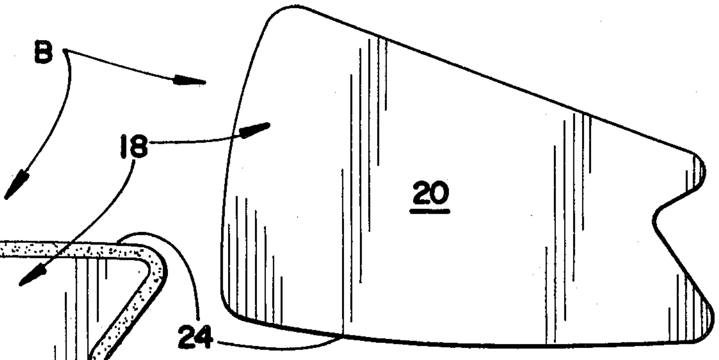
FIG. 2 is a top plan view of a mask formed in accordance with the present invention.

Referring now to the drawings wherein the showings are for purposes of illustrating preferred and alternative embodiments of the invention only and not for purposes of limiting same, FIG. 1 shows a portion of a workpiece A adapted to receive a so-called area coated mask B formed in accordance with the present invention as shown in FIGS. 2 and 3.

More particularly, workpiece A of FIG. 1 includes a workpiece first area 10 and a workpiece second area 12. Areas 10, 12 are separated from each other by some predetermined demarcation zone 14. As shown, this demarcation zone entirely encloses and isolates workpiece second area 12 from workpiece first area 10. The demarcation zone itself may be along some break line, highlight line and the like or may be simply located at some predetermined and particular location on a portion of a planar surface which comprises the overall workpiece A. The demarcation zone configuration shown is merely by way of example and it should be readily appreciated that the subject invention is readily adapted to use with the other regular or irregular configurations as may be required to fulfill or meet some specific painting requirements. Moreover, the invention is also readily adapted to use in conjunction with original workpiece painting, refinish painting and/or repair painting.

Referring to both FIGS. 2 and 3, mask B is comprised of a thin, flexible mask layer 18 having opposed faces 20 (FIG. 2), 22 (FIG. 3) and a peripheral edge or contour 24 extending therearound. As shown, face 20 comprises the mask outer face and face 22 comprises the mask inner face. In the preferred arrangement here under discussion, mask layer 18 is constructed from a thin paper or paper-like material for obtaining the best overall results as will become apparent hereinafter. By way of example only, the mask layer may have a thickness of approximately 3 or 4 mils. However, the other materials, thicknesses and the like may be advantageously employed for layer 18 to accommodate different applications and environments.

Preferably, mask layer peripheral edge 24 has substantially the precise contour of conformation as predetermined demarcation zone 14. Thus, and when the mask is applied to the workpiece, workpiece second area 12 will be entirely covered substantially precisely coextensive with the demarcation zone itself. To accommodate securing or affixing of the mask to the workpiece, a band-like adhesive zone or area 30 is advantageously provided on mask face 22 adjacent to and coextensive with peripheral edge 24. The width of this adhesive band or zone is generally in the range of $\frac{1}{4}''-\frac{3}{4}''$, although variation therefrom may be utilized as deemed necessary and/or appropriate. The adhesive itself is of the acrylic type and is preferably sprayed, printed or coated onto face 22 so as to assume the general conformation shown.

Figure 4:
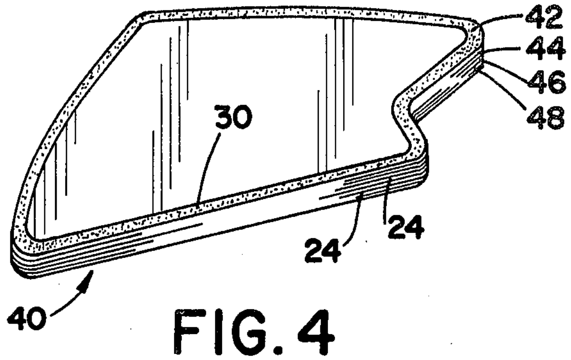
FIG. 4 is a perspective view of a mask pad formed in accordance with the present invention.

In accordance with the preferred form of the mask and method, a pad of identical masks are advantageously prepared and supplied for ultimate use. Such a pad is generally designated 40 in FIG. 4 and is comprised of a plurality of identical masks 42, 44, 46, 48 and so on for some predetermined number. More particularly, fifty or so individual masks will comprise a single one of pads 40. In the preferred method of manufacture, the thin, flexible material which comprises mask layers 18 may be provided in large rolls or the like having a width at least sufficient to accommodate manufacture of masks therefrom at spaced intervals therealong. The portion of the layer which is to define each mask outer face 22 preferably includes a release coating thereon which is releasably compatible with the particular adhesive employed to define adhesive zone 30. The release coating typically comprises a polyethylene coating integral with one face of the mask layer material. Although this release coating is supplied and integral with the mask layer material itself, it could also be separately applied at the time of mask manufacture and/or comprised of other release type coatings and materials.

For manufacturing purposes, band-like adhesive zone or area 30 is first applied to each mask layer to have at least the same general conformation of the intended predetermined demarcation zone. Again, this adhesive material may be sprayed, printed or coated or otherwise applied to mask layer face 22. Each of the plurality of mask layers is identically prepared and, of course, the configuration of demarcation zone 14 on which the masks will be employed is known in advance. Thus, the configuration and dimensioning of adhesive zones or areas 30 are designed and adjusted accordingly. Once an appropriate number of the mask layers have had the adhesive zone applied, the plurality of individual layers 18 may be stacked on top of one another with the adhesive area on face 22 of each mask layer directly engaging the release coating on face 20 of the next adjacent mask layer. Once precisely aligned with each other to form the basic stack and also temporarily fixedly secured in that relationship, the stack is die cut so as to substantially simultaneously form identical peripheral edges 24 for all of the layers. Thus, the fifty or so individual masks 42, 44, 46, 48, etc. which are generated by the step of die cutting to define pad 40 are virtually identical to each other. In the arrangement shown, mask peripheral edges 24 are substantially or virtually identical in conformation and dimension to the desired predetermined demarcation zone 14 (FIG. 1).

The release coating disposed on face 20 of each mask layer advantageously allows easy and convenient removal of individual masks from pad 40 when and as necessary without interference by or with adhesive zone 30 of the next adjacent mask in the pad. Use of pads 40 facilitate ready application of masks of individual workpieces on a production line basis. Moreover, each mask may include some type of printed indicia or the like to at some convenient location thereon coordinate use of the proper mask with a particular workpiece configuration and to assist in properly locating the mask on the demarcation zone area. These features are particularly significant where a wide variety of workpieces or workpiece styles will be involved on a production line basis through a single masking or painting station.

Figure 5:
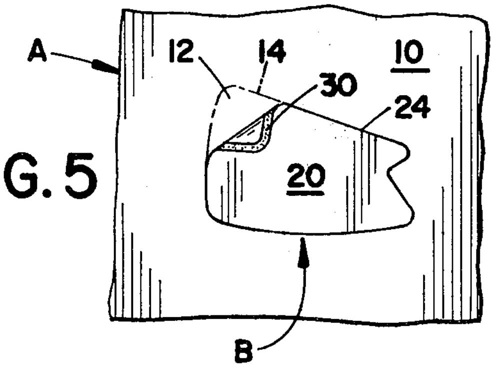
FIG. 5 shows the mask of FIG. 2 as it is being applied on the workpiece of FIG. 1.

FIG. 5 shows workpiece A of FIG. 1 with one of masks B partially installed so as to cover workpiece second area 12. As will be noted, mask peripheral edge 24 precisely corresponds and is coextensive with the predetermined demarcation zone 14. It should be readily appreciated that for some workpieces, the demarcation zone may take the form of a breakline or the like while for other workpieces, the demarcation zone may simply comprise some location or area on a planar surface which will include the workpiece first and second areas in the finished painted product. Band-like adhesive zone 30 acts to maintain the mask in position peripherally around the demarcation zone slightly inboard thereof. Once located, the mask may be pressed against the workpiece either by hand or by means of a hand-tool for obtaining a good adhesively secured relationship between the workpiece and mask.

Figure 6:
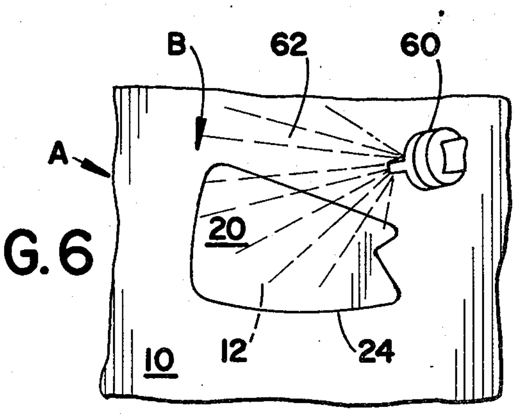
FIG. 6 is a view similar to FIG. 5 with the mask fully installed and the workpiece being spray painted; and, FIG. 7 shows an alternative mask arrangement which incorporates the overall concepts of the present invention.

Thereafter, and as shown in FIG. 6, workpiece first area 10 may be painted by conventional techniques such as, for example, by a spray paint mechanism schematically designated 60 having paint particles 62 issuing therefrom. Since the entirety of workpiece second area 12 is masked, only the exposed workpiece first area 10 will receive paint. Upon completion of the spray painting process and/or following oven baking, mask B may be removed from the workpiece by simply grasping a corner of the mask and then pulling it back against itself at an angle of approximately 180 degrees. The material which comprises mask layer 18 and the adhesive material which comprises band 30 are selected to be of a type which will allow the mask to withstand 350 degrees F oven baking for one hour and then further allow the mask to be removed clearly and easily from the workpiece surface without leaving any adhesive residue. The finished paint edges, i.e., the edge defined by demarcation zone 14 will be crisp and clean with a minimum of paint build-up.

The foregoing area coated paint mask and method are considered to be a valuable advance to the state of the art. The mask and method accommodate precise masking of regular and irregular workpiece areas and are versatile in that they may be adapted to use for any number of different painting applications and environments. The precise configuration of mask peripheral edge 24 relative to a predetermined desired demarcation zone allows the mask to be quickly and easily installed with limited expertise and experience being required for the applicator. As discussed above, prior masking systems of this general type have applicator experience to some substantial extent in order to achieve satisfactory relied upon masking and painting results.

Figure 7:
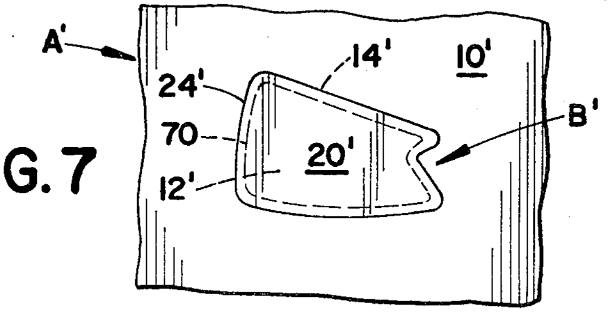

FIG. 7 shows a modified mask construction which incorporates the overall concepts of the present invention. For ease of illustration and appreciation of this modification, like components are identified by like numerals with a primed (′) suffix and new components are identified by new numerals.

In this FIGURE, mask B′ has a peripheral edge 24′ dimensioned to be slightly larger than predetermined demarcation zone 14′. Peripheral edge 24′ has, however, the same general conformation as demarcation zone 14′ and a band-like adhesive area is included on the mask inner face at a location which allows the adhesive to engage workpiece second area 12′ at and along the demarcation zone. Thus, mask B′ includes a band-like margin area or zone 70 peripherally therearound between the edge of the adhesive which corresponds to the workpiece demarcation zone and mask peripheral edge 24′. Margin 70 is generally of a constant width over its entire peripheral extent with such width normally being in the range of approximately ¼″ or so. However, other widths may also be advantageously employed to accommodate particular masking circumstances.

As with the preferred embodiment described above, the band-like adhesive zone is applied to the mask inner face to be substantially coextensive with demarcation zone 14′ and to extend slightly inwardly therefrom over the width of the band-like adhesive zone or area. Since margin 70 is not itself affixed to the workpiece, it may be conveniently lifted therefrom so as to diverge outwardly of workpiece first area 10' at an acute angle from substantially precisely at demarcation zone 14'. This arrangement advantageously results in a feathering of the paint adjacent the demarcation zone when the workpiece first area is spray painted. The specifics of such painting and the results obtained therefrom are described in detail in the commonly assigned U.S. patent application Ser. No. 165,616, filed July 3, 1980 and now issued as U.S. Pat. No. 4,313,970.

The concepts of the subject invention are considered to be readily applicable to all types of painting situations where a workpiece is to be painted along some predetermined precise and continuous demarcation zone. The demarcation zone may be generally straight line, curvilinear or irregular and preferred uses of the mask and method are for initial or original painting of vehicle bodies, for so-called refinish painting of both large and small areas on vehicle bodies and for repainting subsequent to repair. The term demarcation zone as it is used herein refers to any line, whether visible or imaginary, which separates a workpiece into first and second areas. Although the automobile industry is considered to be the preferred environment of use, the subject invention is deemed to be equally adapted to effective use in painting many other types and styles of workpiece or products.

The invention has been described with reference to the preferred and alternative embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. A method of masking a workpiece to facilitate spray painting of a workpiece first area which is separated from a workpiece second area by a continuous demarcation zone, said method comprising:

providing a thin, flexible paint mask sheet having opposed faces; applying an adhesive coating to one face of said mask sheet in a manner forming an adhesive band similar in overall contour to the outline of said demarcation zone and having one side edge extending along said mask sheet at least substantially coextensive with said demarcation zone with another side edge laterally spaced from said one side edge, said mask sheet and adhesive being capable of withstanding 350° F. oven baking for at least one hour; applying a release surface on the other face of said mask sheet releasably compatible with said adhesive; stacking a plurality of identical mask sheets to produce a mask pad having a predetermined number of identical ones of said mask sheets disposed in a stacked relationship with on face of each mask sheet directly engaging the release surface on the other face of the next adjacent mask sheet; cutting said stacked mask sheets to form a plurality of masks each having a peripheral edge of the same general conformation as the demarcation zone and with said adhesive band on one side edge disposed on said mask at least adjacent said peripheral edge; individually removing a mask from said pad; placing said mask on said workpiece second area with said mask peripheral edge being positioned to at least generally correspond to said continuous demarcation zone; causing said mask to precisely cover said workpiece second area along and coextensive with said demarcation zone at least at said adhesive band one side edge; directing a paint spray toward said workpiece to effect painting of said workpiece first area; and, removing said mask from association with said workpiece.

2. The method as defined in claim 1 wherein said step of cutting includes dimensioning said mask so that said outer peripheral edge will extend slightly outward of said demarcation zone onto said workpiece first area during said step of placing for defining a band-like margin area around said demarcation zone, said step of causing comprising lifting said margin area from said workpiece first area to diverge outwardly therefrom at an acute angle from substantially precisely along said demarcation zone.

3. A paint mask particularly adapted for masking one area of a workpiece disposed on one side of a continuous demarcation zone to facilitate spray painting of another area of said workpiece disposed on the other side of said demarcation zone, said paint mask comprising:

a plurality of identical thin, flexible paint mask sheets, each having opposed faces and a peripherical edge configured to have the same general conformation as some continous demarcation zone on a workpiece with which said mask is adapted to be associated; an adhesive disposed on one face of said mask sheet forming a narrow band-like adhesive zone at least adjacent said mask sheet peripheral edge and adapted to adhesively engage an associated workpiece at least closely adjacent the workpiece demarcation zone, said mask sheet and adhesive being capable of withstanding 350° F. oven baking for at least one hour; a release surface associated with the other face of said mask sheet being releasably cooperable with the adhesive on said one face; and, said plurality of identical mask sheets being disposed in a stacked relationship to form a mask pad, the band-like adhesive zone on the one face of each mask being disposed in direct engagement with the release surface on the other face of the next adjacent mask whereby individual ones of the masks may be removed from said pad for masking associated workpieces.

4. The method as defined in claim 1 wherein said mask is adapted to cover a workpiece second area which is bounded by a continuous demarcation zone and further includes performing said step of cutting so that said mask is slightly larger than the workpiece second area with said mask peripheral edge being spaced from said band one side edge and being slightly larger than and generally corresponding to the overall conformation of the predetermined demarcation zone.

5. A method of making a paint mask adapted to be installed on a workpiece to facilitate spray painting of a workpiece first area disposed on one side of a continuous demarcation zone from a workpiece second area, said method comprising the steps of:

providing a mask sheet of thin, flexible material having opposed faces; applying adhesive to one face of said mask sheet in a manner forming a band-like adhesive area similar to the conformation of a demarcation zone on a workpiece with which said mask is to be associated, said band-like adhesive area having one side edge at least substantially coextensive with the conformation of such demarcation zone and another side edge spaced from said one side edge with said mask sheet and adhesive being capable of withstanding 350° F. oven baking for at least one hour; having a release surface on the other face of said mask sheet, said release surface being of a type releasably compatible with said adhesive, and wherein said steps of providing, applying, and having are identically repeated for a plurality of mask sheets; stacking said plurality of mask sheets so that the adhesive band-like area of each mask sheet is in direct engagement with the release surface on the other face of the next adjacent mask sheet and with the adhesive band-like areas of said plurality of mask sheets precisley aligned with each other to form a pad of identical mask sheets; and, cutting said pad to form masks each having a peripheral edge of the same general conformation as the demarcation zone with said adhesive area one side edge disposed on said masks at least adjacent said peripheral edge.

6. A method of masking a workpiece to facilitate spray painting of a workpiece first area which is separated from a workpiece second area by a continuous demarcation zone, said method comprising:

providing a thin, flexible paint mask sheet having opposed faces; applying an adhesive coating to one face of said mask sheet in a manner forming an adhesive band similar in overall contour to the outline of said demarcation zone and having one side edge extending along said mask sheet at least substantially coextensive with said demarcation zone with another side edge laterally spaced from said one side edge; applying a release surface on the other face of said mask sheet releasably compatible with said adhesive; including printed indicia on said mask sheet to coordinate use of the mask with the configuration of said workpiece and to assist in properly aligning said peripheral edge along said demarcation zone; stacking a plurality of identical mask sheets to produce a mask pad having a predetermined number of identical ones of said mask sheets disposed in a stacked relationship with one face of each mask sheet directly engaging the release surface on the other face of the next adjacent mask sheet; cutting said mask sheets to form masks each having a peripheral edge configured substantially identical to said demarcation zone and with said adhesive band on one side edge disposed on said mask at least adjacent said peripheral edge; individually removing a mask sheet from said pad; placing said mask on said workpiece second area with said mask peripheral edge aligned to substantially precisely correspond with said continuous demarcation zone; causing said mask to precisely cover said workpiece second area along and coextensive with said demarcation zone at least at said adhesive band one side; directing a paint spray toward said workpiece to effect painting of said workpiece first area; and, removing said mask from association with said workpiece.

7. A paint mask particularly adapted for masking one area of a workpiece disposed on one side of a continuous demarcation zone to facilitate spray painting of another area of said workpiece disposed on the other side of said demarcation zone, said paint mask comprising:

a plurality of identical thin, flexible paint mask sheets, each having opposed faces and a peripheral edge configured to have substantially the precise conformation as some continuous demarcation zone on a workpiece with which said mask is adapted to be associated, each mask sheet further including printed indicia adapted to coordinate the use of said mask with an associated workpiece and to assist in properly aligning said peripheral edge along a workpiece demarcation zone; an adhesive disposed on one face of said mask sheet forming a narrow band-like adhesive zone extending inwardly from said peripheral edge and adapted to adhesively engage an associated workpiece at least closely adjacent the workpiece demarcation zone; a release surface associated with the other face of said mask sheet, said release surface being releasably cooperative with the adhesive on said one face; and, said plurality of identical mask sheets being disposed in a stacked relationship to form a mask pad, the band-like adhesive zone on the one face of each mask being disposed in direct engagement with the release surface on the other face of the next adjacent whereby individual ones of said masks may be removed from said pad for masking associated workpieces.

8. A method of making a paint mask adapted to be installed on a workpiece to facilitate spray painting of a workpiece first area disposed on one side of a continuous demarcation zone from a workpiece second area wherein said mask is adapted to cover said second area, said method comprising the steps of:

providing a mask sheet of thin, flexible material having opposed faces; applying adhesive to one face of said mask sheet in a manner forming a band-like adhesive area similar to the conformation of a demarcation zone on a workpiece with which said mask is to be associated, said band-like adhesive area having one side edge at least substantially coextensive with the conformation of such demarcation zone and another side edge spaced from said one side edge; having a release surface on the other face of said mask sheet of a type releasably compatible with said adhesive; including printed indicia on the mask sheet to coordinate the use of the mask with a workpiece and to assist in properly aligning said peripheral edge along the demarcation zone of an associated workpiece, and wherein said steps of providing, applying, including, and having are identically repeated for a plurality of mask sheets; stacking said plurality of mask sheets so that the adhesive band-like area of each mask sheet is in direct engagement with the release surface on the other face of the next adjacent mask sheet and with the adhesive band-like areas of said plurality of mask sheets precisely aligned with each other to form a pad of identical mask sheets; and, cutting said pad to form masks each having a peripheral edge substantially precisely corresponding to the conformation of the demarcation zone with said adhesive area one side edge disposed on said masks co-terminus with said peripheral edge.

* * * * *